United States Patent [19]
McGlew

[11] Patent Number: 6,089,515
[45] Date of Patent: Jul. 18, 2000

[54] BICYCLE HEAD SUPPORT

[76] Inventor: Michael McGlew, 21 Plotts Rd., Newton, N.J. 07860

[21] Appl. No.: 09/053,449

[22] Filed: Apr. 1, 1998

[51] Int. Cl.[7] .................................................. B68G 5/00
[52] U.S. Cl. ............................................................ 248/118
[58] Field of Search ................................ 248/118, 188.5, 248/600, 601, 602, 624; 280/220, 288.2, 304, 451

[56] References Cited

U.S. PATENT DOCUMENTS

| | | | |
|---|---|---|---|
| 1,961,244 | 6/1934 | Pottern | 4/523 |
| 4,900,014 | 2/1990 | DeGraff | 272/73 |
| 5,158,513 | 10/1992 | Reeves | 482/56 |
| 5,324,059 | 6/1994 | Bryne | 280/283 |
| 5,464,271 | 11/1995 | McFarland | 280/220 |
| 5,568,954 | 10/1996 | Burgess | 292/338 |
| 5,702,093 | 12/1997 | Liao | 267/132 |
| 5,749,590 | 5/1998 | Roerig | 280/276 |

*Primary Examiner*—Anita M. King
*Attorney, Agent, or Firm*—McGlew and Tuttle, P.C.

[57] ABSTRACT

A head support for a bicycle is provided including a bicycle attachment piece. A head interface is provided connected to the attachment piece. The head interface preferably includes a cushion and chin receiving region for resting the riders chin in a cushioned and supported manner. The head interface is connected to the bicycle attachment piece via a breakaway arrangement. The breakaway arrangement provides a relatively stable connection between the cushion and the bicycle attachment piece during normal operations. However, the breakaway arrangement allows movement of the cushion upon the application of forces, such as forces in a non-head support direction. Particularly during a fall or other sudden movement of the user relative to the head support, the breakaway arrangement allows the head interface to be moved out of the way of the user.

9 Claims, 2 Drawing Sheets

BICYCLE HEAD SUPPORT

FIELD OF THE INVENTION

The invention relates generally to bicycles and more particularly to an interface between a bicycle rider and the bicycle.

BACKGROUND OF THE INVENTION

Various different interfaces have been used for support of the upper body of a bicycle rider. Besides the handle bars for controlling the bicycle, arm supports have been used in the front region of the bicycle for supporting the hands and arms of a bike rider. This provides distributed support of the upper body and allows the hands and wrists to be rested to some degree. Arm rests are particularly useful for road bikers and racers in situations where a great deal of steering of the bicycle is not required.

Particularly for bicycle racing, also for road biking in general, the upper body is often supported at the front end of the bicycle, namely supported apart from the seat or saddle. Apart from fatigue of the hands and wrists of the bike rider a particular source of fatigue, relates to supporting ones head. Particularly for road biking, muscles around the neck can become quite fatigued during long rides.

SUMMARY AND OBJECTS OF THE INVENTION

It is an object of the invention to provide a safe and reliable support for the head of a bicycle rider.

It is a further object of the invention to reduce stress and fatigue to a bicycle riders neck and shoulder area.

Still another object of the invention is to provide a bicycle rider interface which includes features to allow increased pedalling endurance, better circulation and oxygen supplied to the legs and reduced fatigue to other muscle areas of a bicycle rider.

According to the invention, a head support for a bicycle is provided including bicycle attachment means. A head interface is provided connected to the attachment means.

The head interface preferably includes a cushion and chin receiving region for resting the riders chin in a cushioned and supported manner.

According to another aspect of the invention the head interface is connected to the bicycle attachment piece via breakaway means. The breakaway means provides a relatively stable connection between the cushion and the bicycle attachment piece during normal operations. However, the breakaway piece allows movement of the cushion upon the application of forces, such as forces in a non-head support direction. Particularly during a fall or other sudden movement of the user relative to the head support, the breakaway means allows the head interface to be moved out of the way of the user.

According to still another aspect of the invention, the head interface and the bicycle attachment piece are connected via a damping means, specifically to dampen forces in a support direction. The damping means is preferably a spring or other shock absorber allowing a damping of forces along the general direction of support.

A particularly advantageous result of one aspect of the invention is the use of a common spring for setting support direction damping (shock absorption) and the threshold for the breakaway function. The frictional force at an interface, which is a function of the spring force, can be reliably set for the breakaway function to occur at a force value component in a non support direction.

According to still another aspect of the invention the head interface is connected to the bicycle attachment piece via an adjustable connection, specifically to adjust the distance between the head support and the bicycle attachment piece. This is advantageous both with respect to different bicycle riders using the same bicycle head support but also for fine adjustment during the course of a ride.

The invention further provides bicycle an attachment piece which includes structure for easily connecting and disconnecting the bicycle attachment piece and the connected interface to a bicycle but also maintaining it fixed securely during operation.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
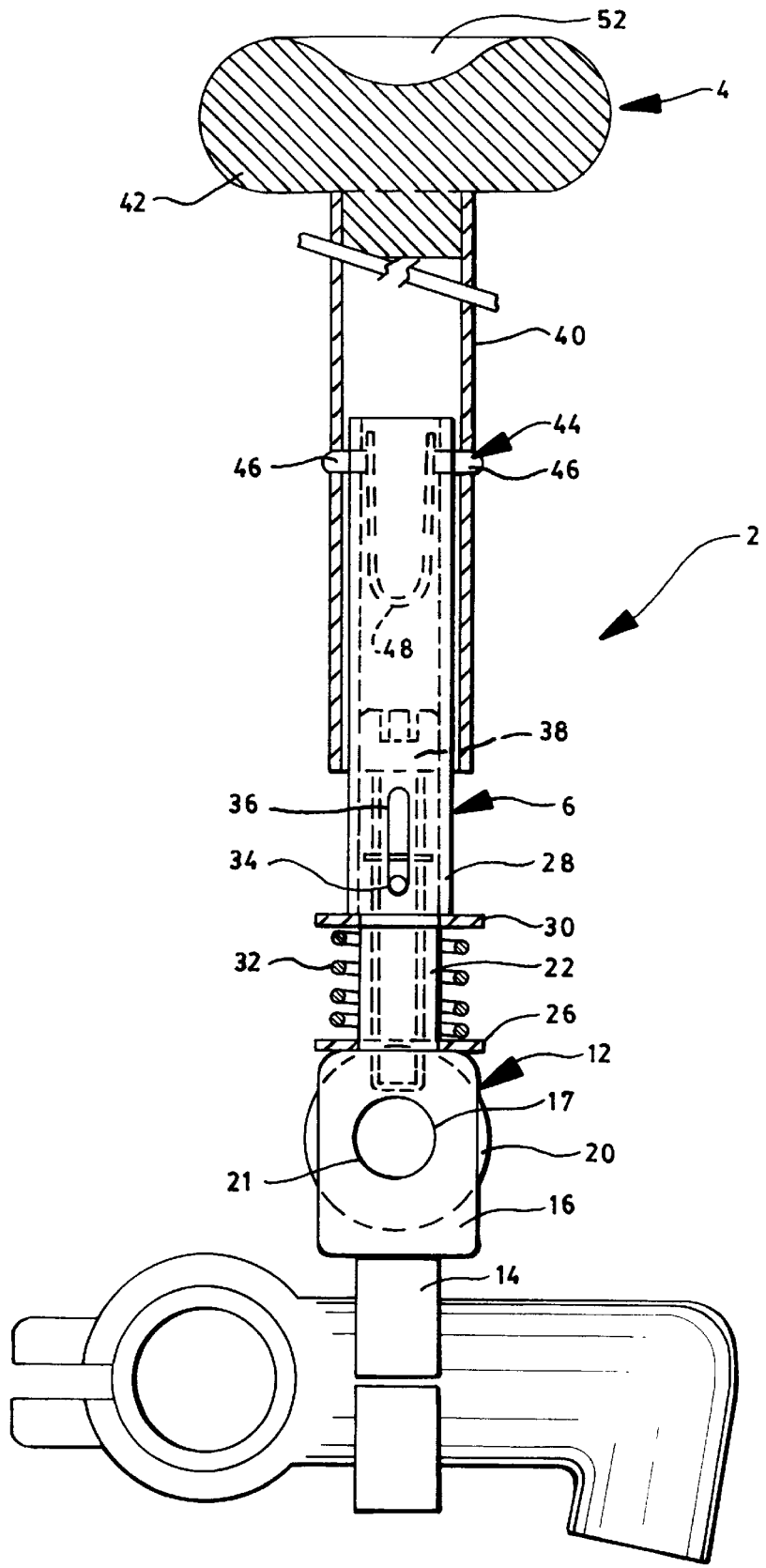
FIG. 1 is a side partially sectional view of the bicycle head support according to the invention, connected to a bicycle handle bar.
Figure 2:
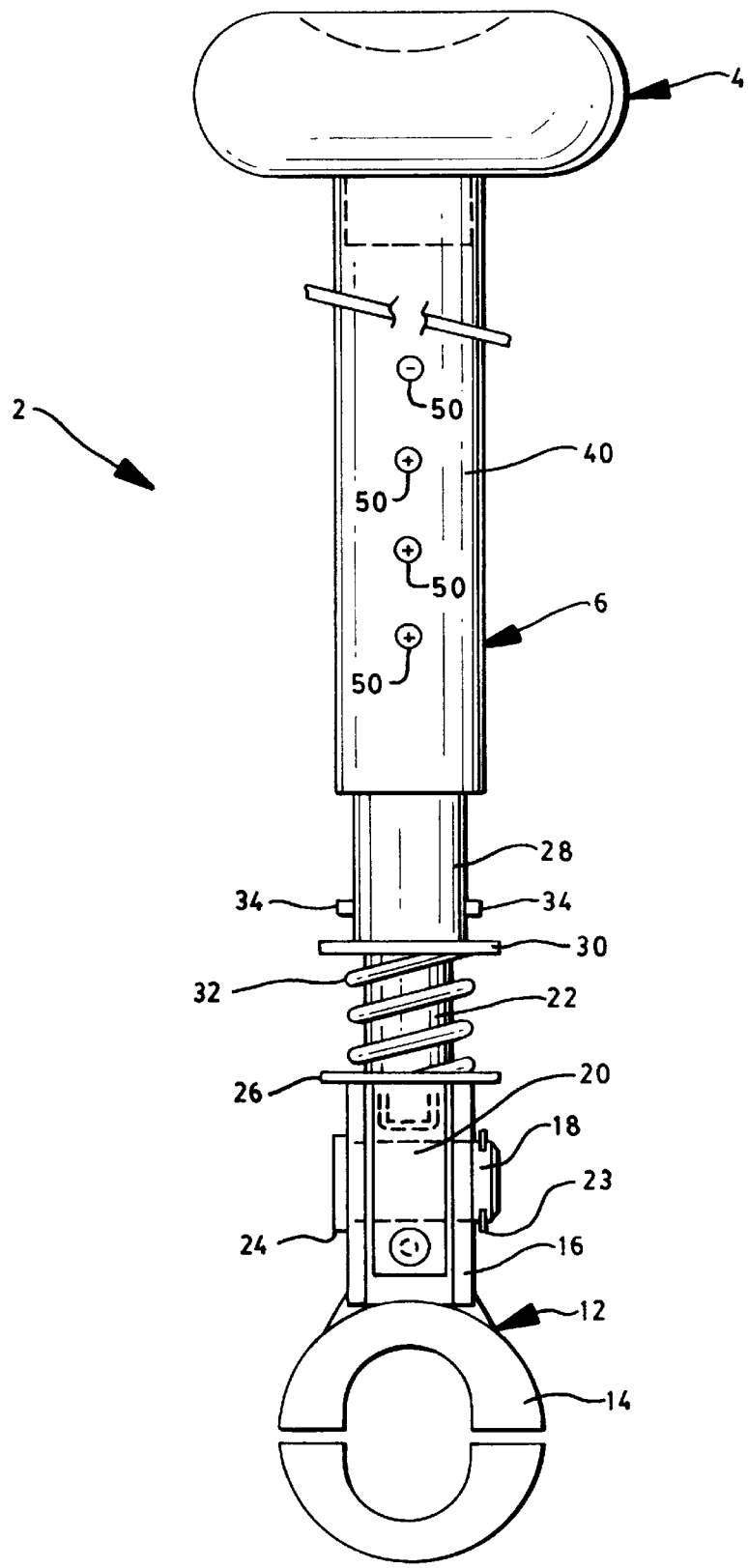
FIG. 2 is a front view of the bicycle head support according to the invention.

Referring to the drawings in particular, the invention comprises an adjustable bicycle head support generally designated 2. The adjustable bicycle head support 2 includes the head interface generally designated 4 connected via connection structure generally designated 6 to the bicycle attachment piece generally designated 12.

The bicycle attachment piece 12 preferably includes a clamp collar portion 14, a breakaway yoke 16. The breakaway yoke 16 is formed with two openings 17. Axle 18 is supported in the openings 17.

A coupling nut 20 includes an opening 21 for receiving the axle 18 to join the coupling nut 20 with the breakaway yoke 16. Coupling nut 20 also preferably includes post portion or hollow post 22. The axle 18 preferably has one end with an axle flange 24 and an opposite end with an opening for receiving pin 23. This provides a stable fixing of the coupling nut 20 to the bicycle attachment piece 12.

A yoke engagement flange 26 is disposed above breakaway yoke 16. This yoke flange 26 includes a central opening through which hollow post 22 passes. The yoke flange 26 provides an upper annular surface.

To construct the bicycle attachment piece 12, a two piece clamp collar is modified by welding it to two plates to form the breakaway yoke 16. The yoke flange 26 may be for example a washer, SAE, or a machinery bushing.

The connection means 6 includes an inner support tube 28 with a tube flange 30 at a lower end, providing another flat annular surface surrounding the hollow post 22. The inner support tube 28 receives a top end of the hollow post 22. Coil spring 32 is disposed between the annular surface of tube flange 30 and the annular surface of yoke flange 26. The inner support tube 28 is preferably formed with a support tube slot 36. The upper end of hollow post 22 is provided at its outer periphery with roll pin 34 which passes through this support tube slot 36. Depending on the length of the support tube slot 36, a travel distance is provided for movement of the inner support tube 28 relative to the coupling nut 20 (particularly the hollow post 22 of the coupling nut 20). Depending on the spring nature of coil spring 32, shock absorbing or dampening forces will be affected which come up in an axial direction through the connection means 6 or are applied to the head interface 4, relative to the bike. The characteristics of the spring 32 also affects the breakaway force by changing the frictional force between the upper surface of yoke 16 and the lower surface of yoke engagement flange 26. These surfaces may also be made with special features to affect the frictional characteristics.

A socket head cap screw 38 is preferably connected in the hollow region of hollow post 22. The socket head portion provides additional structural support between the coupling nut 20 and the inner support tube 28. This is especially useful when the roll pin 34 is at the full travel point allowed based on the length of support tube slot 36.

An outer support tube 40 is provided which is connected to a cushioned top 42. Outer support tube 40 is preferable connected to the inner support tube 28 via a height adjustable means 44. Although various height adjustment means are possible, a preferred height adjustment structure includes buttons 46 provided extending through openings from an inner side of the inner support tube 28 to an outer side of the inner support tube 28. The buttons 46 are connected via a spring 48 which biases the buttons outwardly. The outer support tube 40 is provided with a plurality of height adjusting holes 50 which are engaged by the buttons 46. In operation, a user may press on the buttons 46 from the exterior of the outer support tube 40. Particularly with rounded buttons 46, the buttons 46 may be pressed as the outer support tube 40 is moved such that the buttons are fully within the outer support tube 40 and the outer support tube 40 may be moved such that the buttons 46 are allowed to protrude out of another height adjusting hole 50. In this way, the buttons may be used to connect to any one of the height adjusting holes 50 (preferably provided on each side) allowing a connection and disconnection between the inner support tube 28 and the outer support tube 40 and allowing a refixing and reconnection of one of the various different positions of the pairs of height adjusting holes 50.

A cushion 42 is preferably formed with a chin receiving region 52. This region is preferably defined to form an ergonomic surface both to support the chin in a comfortable manner but also to allow a person to move their head to some degree and allow the chin to be engaged and disengaged in a smooth and simple manner.

In operation, the position of the head interface 4 is adjusted with respect to the bicycle attachment piece 12 using the height adjustment means 44. The user then starts riding the bicycle and as needed, the head is rested on the head interface, particularly by resting the chin on the surface 52 of cushion 42. In the situation of a fall or other abrupt and possibly uncontrolled movement of the rider toward the adjustable head support (during use or otherwise) the frictional connection between the yoke carried flange 26 and the breakaway yoke 16 is overcome (the frictional engagement between yoke engagement flange 26 breakaway yoke 16 is overcome, the frictional force to be overcome being a function of the force of the spring on the annular surface of yoke engagement flange 26), whereby the head interface 4 pivots out of the way of the user.

While specific embodiments of the invention have been shown and described in detail to illustrate the application of the principles of the invention, it will be understood that the invention may be embodied otherwise without departing from such principles.

What is claimed is:

1. A bicycle head support comprising:
    a head interface including a cushion and a head receiving portion;
    a bicycle attachment including an attachment piece for connecting the bicycle head support to a bicycle and disconnecting the bicycle head support from the bicycle;
    a connection from said head interface to said bicycle attachment, said connection including a breakaway connection part providing movement between said head interface relative to said bicycle attachment and a force threshold mechanism for setting a force threshold at said breakaway connection for allowing movement at said breakaway connection of said head interface relative to said bicycle attachment upon exertion of forces on one of said head interface and said connection above the force threshold;
    a shock absorber for damped movement of said bicycle attachment relative to said head interface upon application of forces to one of said attachment piece and said head interface.

2. A bicycle upper body support according to claim 1, wherein said connection includes an adjustment device for arranging a position of said head interface relative to said bicycle attachment and fixing a position of said head interface relative to said bicycle attachment.

3. The bicycle upper head support according to claim 2, wherein said adjustment device includes openings defined by a first tube and spring supported protuberances provided in a second tube, said spring supported protuberances being engagable with said openings of said first tube.

4. A bicycle head support according to claim 1, wherein said shock absorber forms a part of said force threshold mechanism.

5. A bicycle upper body support comprising:
    an upper body interface means including an upper body receiving portion for receiving a part of a riders upper body and for supporting the riders upper body;
    bicycle attachment means including an attachment piece for connecting the bicycle upper body support to a bicycle and disconnecting the bicycle upper body support from a bicycle;
    connection means for connecting said upper body interface means to said bicycle attachment means, said connection means including breakaway means having a breakaway connection for movement of said upper body interface means relative to said bicycle attachment piece from an operative position with said upper body receiving portion supporting the upper body of the rider to an inoperative position in which said upper body receiving portion is not supporting the upper body of the rider and said connection means including a force threshold means for setting a force threshold at said breakaway connection for allowing movement at said breakaway connection of said upper body interface means relative to said bicycle attachment means upon exertion of forces on one of said upper body interface means and said connection means above the force threshold.

6. A bicycle upper body support according to claim 5, wherein said connection means includes:
    shock absorbing means for damped movement of said bicycle attachment means relative to said upper body interface means upon application of forces to one of said attachment means and said upper body interface means which include components along a support direction above the force threshold.

7. A bicycle upper body support according to claim 6, wherein said shock absorbing means and said threshold means use a common spring element.

8. A bicycle upper body support according to claim 5, wherein said breakaway means includes:

a pivot connection for pivoting the upper body interface means relative to said bicycle attachment means.

9. A bicycle upper body support according to claim 5, further comprising:

adjustment means for adjusting a position of said upper body interface means relative to said bicycle attachment means, wherein said adjustment means includes openings in a first tube and spring supported buttons in a second tube, said spring supported buttons being engageable with said openings of said first tube.

\* \* \* \* \*